(12) United States Patent
Kopp

(10) Patent No.: US 7,607,353 B2
(45) Date of Patent: Oct. 27, 2009

(54) SEALING DEVICE FOR SEALING A PRESSURE MEASURING CELL HOUSING, PRESSURE MEASURING CELL DEVICE AND PRESSURE MEASURING DEVICE COMPRISING THE SAME

(75) Inventor: Thomas Kopp, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 12/003,821

(22) Filed: Jan. 2, 2008

(65) Prior Publication Data
US 2008/0156102 A1 Jul. 3, 2008

Related U.S. Application Data

(60) Provisional application No. 60/907,295, filed on Mar. 28, 2007.

(30) Foreign Application Priority Data

Jan. 3, 2007 (DE) .................. 10 2007 001 445

(51) Int. Cl.
*G01L 7/00* (2006.01)
(52) U.S. Cl. .......................... 73/706; 73/708
(58) Field of Classification Search ............ 73/706, 73/708
See application file for complete search history.

(56) References Cited

U.S. PATENT DOCUMENTS 5,665,920 A * 9/1997 Martin ........................ 73/715

| 6,508,130 | B2 | 1/2003 | Werner et al. |
| 2002/0026835 | A1* | 3/2002 | Jacob et al. .................. 73/708 |
| 2002/0044253 | A1* | 4/2002 | Masuda et al. ............... 349/190 |
| 2005/0258839 | A1* | 11/2005 | Gaignet ...................... 324/696 |
| 2006/0019547 | A1 | 1/2006 | Henn et al. |
| 2007/0028696 | A1* | 2/2007 | Drewes et al. ................ 73/700 |
| 2007/0068264 | A1* | 3/2007 | Muth et al. ................... 73/715 |
| 2007/0277617 | A1* | 12/2007 | Wolfer et al. ................. 73/723 |
| 2008/0236255 | A1* | 10/2008 | Martinoty et al. ........... 73/54.38 |

FOREIGN PATENT DOCUMENTS

| DE | 201 11 919 U1 | 10/2002 |
| DE | 10 2004 032 984 A1 | 1/2006 |
| EP | 1 126 259 A1 | 8/2001 |

* cited by examiner

*Primary Examiner*—Andre J Allen
(74) *Attorney, Agent, or Firm*—The Nath Law Group; Jerald L. Meyer; Derek Richmond

(57) ABSTRACT

The invention relates particularly to a sealing device (8) for sealing a pressure measuring cell housing (3), wherein the sealing device (8) comprises a pressure compensation opening (23; 23') for a pressure compensation line (21; 21'; 21", 20) of a pressure measuring cell (4) received in the pressure measuring cell housing (3), wherein the sealing device (8) is made of a dimensionally stable hard part (18; 18\*; 18') having at least one elastic soft part (19; 19°; 19\*; 19'), which is disposed in the region of the pressure compensation opening (23; 23') on the hard part (18; 18\*; 18').

15 Claims, 3 Drawing Sheets

SEALING DEVICE FOR SEALING A PRESSURE MEASURING CELL HOUSING, PRESSURE MEASURING CELL DEVICE AND PRESSURE MEASURING DEVICE COMPRISING THE SAME

This application claims the benefit of prior U.S. Provisional Patent Application No. 60/907,295 filed Mar. 29, 2007, the contents of which are hereby incorporated in their entirety.

BACKGROUND OF THE INVENTION (1) Field of the Invention

The invention relates to a sealing device for sealing a pressure measuring cell housing, to a pressure measuring cell device comprising such a sealing device, and to a pressure measuring device comprising such a pressure measuring cell device.

(2) Description of Related Art

Generally known from DE 100 64 811 A1 is a pressure measurement device comprising a housing, wherein a pressure measurement cell is inserted in the front section of the housing. The pressure measurement cell is inserted in the front of the housing by means of special clamping elements. Furthermore, the pressure measurement cell is connected toward the back to a circuit board, wherein the circuit board typically comprises evaluation electronics and is received inside the housing. In the case of a pressure measurement cell operating with the reference pressure, in addition a pressure compensating line is routed through the housing toward the back from the back of the pressure measuring cell.

Particularly in the case of a measuring device for hydrostatic fill level measurement using such integrated electronic circuits, the housing is filled at the back of the pressure measuring cell with a casting compound, such as a curable silicon compound. This serves the protection of the electrotechnical components on the one hand and the reduction of the inner air volume within the housing on the other hand.

It is also generally known to solder pressure measuring cell electronics in a metallic housing, in which a circuit board is received, in a sealing fashion, wherein the pressure compensation is enabled by means of a hose guided through the housing. Often, such measuring devices comprise capacitively evaluating pressure measurement cells.

Configurations of this type are disadvantageous particularly when using a casting material, if this material enters the direct vicinity of an electronics component of the pressure measuring cell, because the casting compound in a capacitive measuring system negatively impacts the temperature behavior, which is to say the short-term behavior, but also the long-term behavior.

SUMMARY OF CLAIMS

It is the object of the invention to provide a sealing device for sealing a pressure measuring cell housing, wherein the device has a simple design and at the same time enables reliable sealing of a free space having one or more electronics components of a pressure measuring cell.

This objective is achieved by a sealing device for sealing a pressure measuring cell housing having the characteristics according to claim 1, by a pressure measuring cell device having the characteristics according to claim 10, and by a pressure measuring device having the characteristics according to claim 14. Advantageous embodiments are the subject matter of the dependent claims.

The invention relates particularly to a sealing device for sealing a pressure measuring cell housing, wherein the sealing device comprises a pressure compensation opening for a pressure compensation line of a pressure measuring cell received in the pressure measuring cell housing, and wherein the sealing device is made of a dimensionally stable hard part having at least one elastic soft part disposed, in particular attached, in the region of the pressure compensation opening. Due to the dimensionally stable hard part, the sealing configuration forms a tight seal for the pressure measuring cell housing and due to the at least one elastic soft part at the same time forms a seal for conducting elements.

The hard part is preferably made of a thermoplastic resin and the soft part of a thermoplastic elastomer. The hard part and the at least one soft part are preferably produced by means of a two-component injection molding method.

A recess is preferably provided in the hard part in the region of the pressure compensation opening on at least one side in order to insert or introduce a pressure compensation line and/or a soft part.

In the region of the pressure compensation opening preferably an elevation is provided, particularly a projecting tubular section of the hard part. Such an elevation supports the added soft part with improved tightness in relation to the pressure measuring cell or, if configured appropriately, makes it possible to insert a pipe or the like or to slip on a preferably slightly elastic hose-shaped element.

The soft part is preferably configured such that it extends through the pressure compensation opening penetrating the hard part. In this way, for example in the case of non-linear guidance, elastic support by the sealing device is enabled, despite very tight sealing.

The soft part is preferably disposed between the hard part and an opening in the pressure measuring cell and a pressure compensation line and encompasses the pressure compensation opening. It is advantageous to configure the soft part such that it extends in the direction to the pressure measuring cell up to the pressure measuring cell.

Separately preferred is also a pressure measuring cell device comprising a sealing device of this type and a pressure measuring cell, wherein a free space having at least one electronics component is formed between the sealing device and the pressure measuring cell.

The soft part preferably rests directly against the pressure measuring cell such that it encompasses an opening of the pressure measuring cell in a tightly sealing manner.

The soft part is preferably configured such that it seals a pressure compensation line of the pressure measuring cell, particularly encompasses it in a tightly sealing manner.

The soft part is preferably configured such that it encompasses a pressure compensation line in a tightly sealing manner, wherein on a side of the sealing device facing away from the pressure measuring cell the pressure compensation line extends through a housing of a pressure measuring device.

Separately preferred is also a pressure measuring device comprising a pressure measuring cell device of this type on the front of a housing, wherein a pressure compensation line extends through the housing in a manner aligned with the pressure compensation opening, wherein the pressure compensation line is sealed by the at least one soft part in relation to the housing interior of the housing and wherein a casting material is potted around the housing interior.

According to the method, the sealing device is preferably formed by means of a two-component injection molding method from the hard part and the at least one soft part.

The key element is thus a sealing device in a measuring device having pressure measuring cell electronics and evaluation electronics according to a particularly preferred embodiment. Advantageously, it is possible that the pressure measuring cell electronics and/or a corresponding electronics component are protected by the sealing device during production against penetrating protective potting compound or air, but that nevertheless pressure compensation is enabled through the sealing device, wherein the sealing device at the same time is configured as a fastening part. This becomes possible in that the sealing device is made of two components, namely a hard part having a supporting effect and a soft part configured as a seal.

Particularly in a capacitive measuring system, in this way it is possible to exclusively leave the capacitively measuring part of the electronics module or of a corresponding electronic component in a free space having air, to tightly seal this free space and fill the remaining part of a measuring device or the housing thereof provided on the back with a casting material. At the same time, according to the most preferred embodiment, it is possible to implement the pressure compensation between the pressure measuring cell on the front and a connection section on the back toward the outside, unimpaired by the casting material.

The sealing device thus makes it possible to tightly seal a pressure measuring cell housing comprising a pressure measuring cell provided on the front, the cell being configured as a relative pressure measuring cell, in the rear region by means of the sealing device, wherein between the sealing device and the pressure measuring cell a free space remains for receiving at least one electronic component. Pressure compensation of the relative pressure measuring cell is enabled by means of one or more pressure compensation lines, which are guided through a pressure compensation opening formed in the sealing device. Sealing of such pressure compensation lines is enabled by the soft part of the sealing device. To this end, the at least one soft part can rest against a separate pressure compensation line in a sealing manner, or it can be routed to an appropriate opening in the pressure measuring cell and thus itself form such a pressure compensation line. Optionally, such a soft part can also be configured on the hard part circumferentially on the outside in order to form a particularly annular seal at the same time for the transition section to the pressure measuring cell housing. Alternatively, however, particularly annular sealing rings can also be inserted in the circumferential region in the known manner.

Preferably particularly two elastic hose projections are formed on the two opposing sides of the hard part as soft parts in the region of the pressure compensation opening in order enable the attachment of separate pressure compensation lines, or optionally at the front also of the pressure measuring cell, both in the direction of the pressure measuring cell and in the direction of an interior of a housing of a pressure measuring device, the interior connecting to the pressure measuring cell housing at the back. Optionally, such separate pressure measuring lines can be routed through the soft parts and optionally also through the pressure compensation opening in the hard part.

In principle, it is possible to produce the hard part and the one soft part, or preferably the plurality of soft parts, in separate production steps and subsequently dispose them adjacent to each other, particularly to attach them to one another by means of gluing, for example. In a particularly preferred embodiment, however, such a sealing device is produced by means of a two-component injection molding method from a first component forming the hard part and one or a plurality of second components forming the soft part. The hard part can be produced, for example, as a plastic injection-molded part from a thermoplastic resin. The soft part can preferably be made of TPE (thermoplastic elastomer) injection molding. With such a configuration, the hard part of the sealing device assumes the fastening function and ensures dimensional stability inside the section of the pressure measuring cell housing at the rear, while the soft part as the elastic region assumes the sealing function.

In this way, a simple, modular design of a pressure measuring cell device or a pressure measuring device comprising such a pressure measuring cell device becomes possible, having few individual parts and thus requiring few manual production steps, which ultimately results in simplified and cost-effective production. An assembly process of seals using manual labor can be replaced with an automated assembly process. An automated assembly process also increases producibility because the assembly of the seal and hoses and/or pressure compensation lines can be performed automatically in a single production process. Spontaneously occurring quality defects are thus avoided.

BRIEF DESCRIPTION OF THE DRAWINGS

One exemplary embodiment will be explained in more detail hereinafter with reference to the drawing. In the illustration of different embodiments, identical reference numerals denote identical or equivalent components or functional characteristics, wherein in this respect also versions of other embodiments are taken into consideration. Shown are.

DETAILED DESCRIPTION

Figure 1:
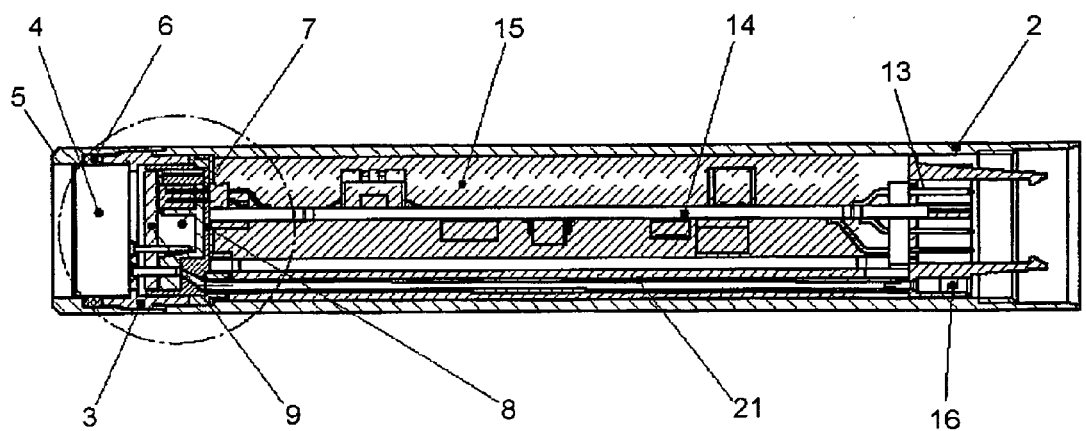
FIG. 1 is a sectional view of a pressure measuring device comprising a pressure measuring cell device at the front, the device being provided with a sealing device for sealing a pressure measuring cell housing toward the back.
Figure 2:
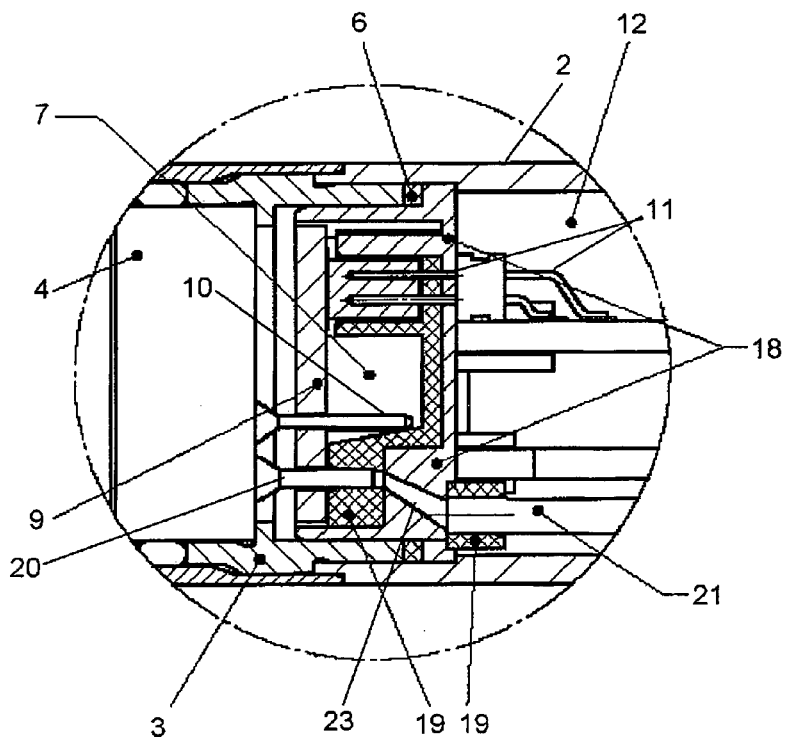
FIG. 2 is an enlarged sectional view to better illustrate the region having the pressure measuring cell housing according to FIG. 1.

FIGS. 1 and 2 show an exemplary pressure measuring device 1 having a housing 2 to which at the front a pressure measuring cell housing 3 comprising a pressure measuring cell 4 inserted therein is attached. The pressure measuring cell housing 3 is preferably detachably fastened in the housing 2, for example screwed in. In a known manner, at the front the pressure measuring cell 4 is inserted in the pressure measuring cell housing 3. As is shown, the pressure measuring cell 4 can be clamped against an inwardly projecting protrusion of the pressure measuring cell housing 3 by means of a cap 5, which is open toward the front and extends at the front over the pressure measuring cell edge. In a configuration of this type, typically a sealing ring 6 is disposed between the cap 5 and the pressure measuring cell housing 3 and/or between the pressure measuring cell and the pressure measuring cell housing in order to seal a free space 7 provided at the back of the pressure measuring cell 4. Alternatively, however, the pressure measuring cell 4 may also be attached directly in or on the pressure measuring cell housing 3, for example glued or soldered thereto.

Toward the back, the pressure measuring cell housing 3 is delimited by a sealing device 8 such that the free space 7 is delimited in the radial direction by inside walls of the pressure measuring cell housing 3, in the forward direction by the pressure measuring cell 4, and in the backward direction by the sealing device 8. The sealing device 8 is preferably disposed on, particularly tightly attached to, the pressure measuring cell housing 3 such that the free space 7 is tightly sealed in relation to the surrounding area. The free space 7 is preferably sealed with sufficient tightness to prevent the penetration of fluids and/or air.

Within the free space 7 preferably at least one electronic component 9 is provided, which is connected in the known manner to the pressure measuring cell 4 by a connection element 10. The electronic component 9 can be configured particularly as a circuit board having electronic components and/or printed circuit board tracks. For securing a contact toward the backward direction, electric conductors 11, which can be configured particularly as plug connections, are routed from the electronic component 9 in the backward direction through the sealing device 8 into the interior or potting space 12 of the housing 2 at the rear. The electric conductors 11 can be routed in the backward direction completely through the housing 2 to a connection device 13 at the back in order to be able to connect the pressure measuring device 1 to external components. Preferably, however, evaluation electronics 14 are received in the housing 2, for example in the form of a printed circuit board having electronic components. In this case, the electric conductors 11 are connected to corresponding counter-contacts of the evaluation electronics 14.

If configured as a pressure measuring device comprising a relative pressure measuring cell as the pressure measuring cell 4, furthermore a pressure compensation line leads from the pressure measuring cell 4 through the free space 7, the sealing device 8 and the space inside the housing 2 to a pressure compensation connection at the back, for example a pressure compensation filter 16. During the production of such a pressure measuring device 1, the interior or potting space 12 of the housing 2 is preferably filled with a casting compound 15 in the known manner as a last step after inserting the evaluation electronics 14 and the pressure compensation line 17. The sealing device 8 is configured such that the casting compound 15 cannot enter the free space 7. Critical regions in this respect are the transitions or openings through which the electric conductors 11 and components for pressure compensation are routed.

An essential element is thus the sealing device 8, which is attached at the back in or on the pressure measuring cell housing 3. In the illustrated embodiment, fastening is performed in that first the sealing device 8 is inserted into the housing 2 from the front to a stop and subsequently the pressure measuring cell housing 3 comprising the pressure measuring cell 4 and the cap 5 is placed on and fastened to the housing 2. Alternatively, however, the sealing device 8 can also be separately attached to the pressure measuring cell housing 3, for example glued and/or screwed to the wall thereof. An electronic component 9, which is preferably received in the free space 7, is fastened particularly in a first assembly step to the sealing device 8, for example clipped on or detachably attached by means of detent elements.

Being a central element, the sealing device 8 is made of at least two separate components, namely a hard part 18 and at least one soft part 19. The hard part 18 preferably extends across the entire rear opening surface of the pressure measuring cell housing 3 and is configured to be dimensionally stable as a supporting and sealing element for the opening of the pressure measuring cell housing 3 at the back. The soft part 19 or soft parts 19, on the other hand, are made of an elastic material, which is sufficiently elastic to enable fluid-tight and/or gas-tight and/or air-tight sealing in relation to an adjacent component. An adjoining component can be particularly a wall of the pressure measuring cell 4, of an electric conductor 11 and/or a pressure compensation line 20, 21. Also the transition region between the outside hard part 18 and the front or lateral wall section of the pressure measuring cell housing 3 can be formed by the soft part 19 or a further such soft part, instead of inserting a sealing ring 22.

The production of the sealing device 8 can occur in a simple manner by producing the different individual components, which is to say the at least one hard part 18 and the at least one soft part 19, and subsequently placing these individual components next to one another. It is particularly advantageous to tightly connect such individual components to one another, for example by means of detent or engaging connections or by mutual adhesion. Particularly preferred, however, is a sealing device 8 which is produced by means of a two-component injection molding method. Particularly in the latter case, the hard part 18 can be produced, for example, as a plastic injection-molded part, from a thermoplastic resin, while the at least one soft part 19 is made particularly of a TPE injection molding material. In this way, the hard part 18 extending transversely through or across the opening of the pressure measuring cell housing 3 forms a tight seal because it is a dimensionally stable component, while the soft part or parts 19 serve as sealing elements.

When using a relative pressure measuring cell as the pressure measuring cell 4, a pressure compensation opening 23 leads through the sealing device 8 in the backward direction from the free space 7 into the rear potting space 12 of the housing 2.

The configuration of the hard part 18 and/or of the at least one soft part 19 is such that a tight connection to the pressure compensation lines 20 and/or a wall of the pressure measuring cell 4 becomes possible.

Based on the embodiment shown in FIGS. 1 and 2, the pressure compensation opening 23 is directed obliquely, which is to say not axially parallel, through the hard part 18, wherein the pressure compensation opening 23 has a stepped or conical diameter in order to enable on either side of the sealing device 8 adjustments to pressure compensation lines 20 or 21 that are opened to different widths. Such a special configuration of the pressure compensation opening 23, however, is only an exemplary embodiment, which does not exclude the configuration in any arbitrary other form, particularly a linear axially parallel cylindrical form.

In order to generate greater stability, the hard part 18 is configured stronger in the region of the pressure compensation opening 23, preferably in the axial direction, than is necessary in the adjoining regions of the hard part 18.

In the exemplary embodiment, two soft parts 19 are formed on the sealing device 8. One of the soft parts 19 is disposed in the backward direction such that it encompasses the pressure compensation opening 23 in order to enable the attachment or insertion or placement of a hose or pipe as the one pressure compensation line 21. In order to offer more stable accommodation and stable retention in the radial or lateral direction, the hard part 18 is preferably configured in the section around the pressure compensation opening 23 in a receding manner, wherein the soft part 19 at least partially engages a region of the hard part 18 receding laterally around the pressure compensation opening 23.

On the opposing front side of the sealing device 8, the soft part 19 provided there preferably extends across nearly the entire width or surface of the sealing device 8 in order to serve also as an elastic receiving element for the electronic component 9 and optionally the connection element 10. In particular, the soft part 19 is configured on the front side around the pressure compensation opening 23 in order to be able to receive the pressure compensation line 20 leading in the backward direction from the pressure measuring cell 4 in a sealing manner. At the same time, the surface of the soft part 19 at the front in this section serves as an elastic support surface for the electronic component 9 configured as a circuit board.

In the pressure measuring cell according to FIGS. 1 and 2 having a capillary as the pressure compensation line 20, the sealing device 8 is thus configured such that the hose projection formed by the soft part is disposed radially around the capillary in a sealing manner. The sections of the soft part 19, into which a capillary or pressure compensation line 20, 21 is inserted, preferably serve as insertion tapers to facilitate assembly.

Figure 3:
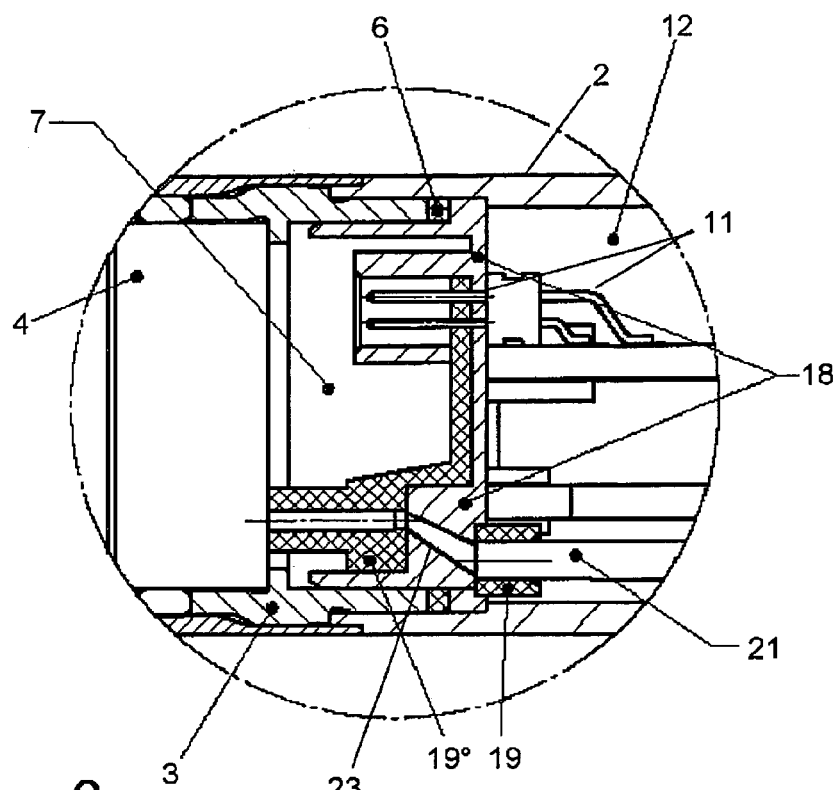
FIG. 3 is an alternative embodiment having a modified sealing device.

FIG. 3 shows a modified embodiment of the sealing device 8, wherein in this illustration the electronic component 9 is not shown for simplicity reasons. In this embodiment, a pressure measuring cell 4 having a simple design is used, which in the backward direction has no capillary or otherwise configured separate pressure compensation line. In other words, the pressure measuring cell 4 only comprises an opening as the pressure compensation opening in the backward direction. In order to enable a connection to the pressure compensation opening 23 in the hard part 18 of the sealing device 8, in this embodiment the soft part 19° at the front is configured in the region of the pressure compensation opening 23 such that comparable to a hose projection it extend up to the pressure measuring cell 4, and rests directly across the pressure measuring cell in a sealing manner. An opening that is routed through the soft part 19° is configured aligned with the opening in the pressure measuring cell 4 and on the opposite side is aligned with the opening of the pressure compensation opening 23 at the front.

Figure 4:
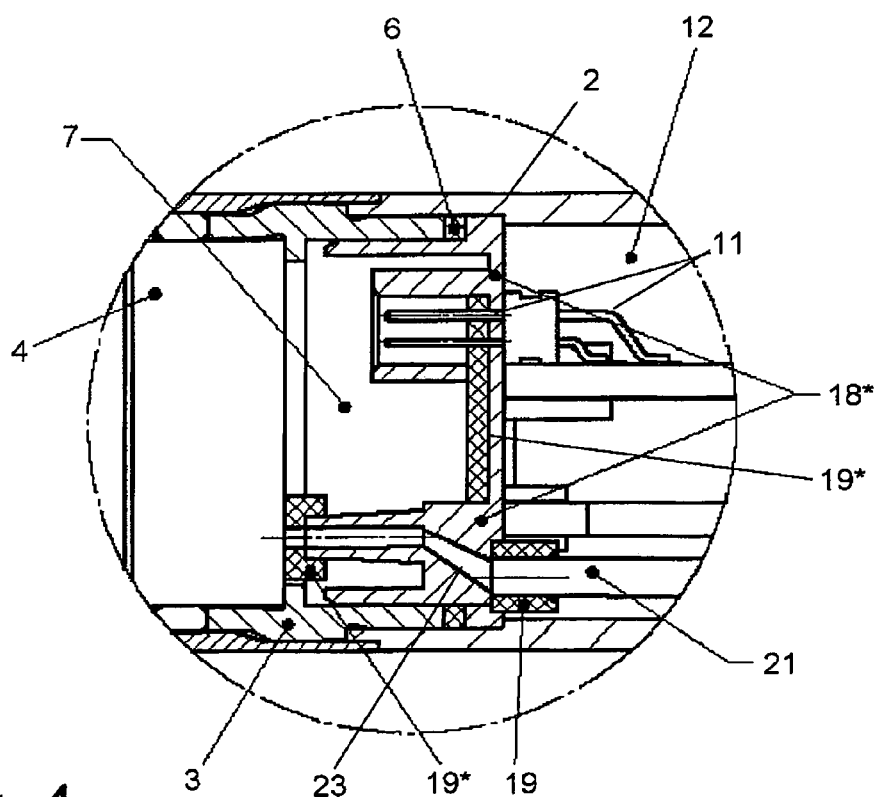
FIG. 4 is a further alternative embodiment having a modified sealing device.

In a further embodiment, which is shown in FIG. 4, the section of the hard part in the forward direction, which is to say in the direction of the pressure measuring cell 4, is extended and protrudes almost to the pressure measuring cell 4 to support the sealing action. In this embodiment, the soft part 19, 19* is formed in the forward direction by a plurality of individual components, wherein for the sealing action of the pressure compensation opening particularly a section covering or partially encompassing a section of the hard part 18* extended at the front is relevant. In this embodiment, thus part of the hard part 18* is configured as a tubular line in the direction of the pressure measuring cell. Of course, such a projecting section of the hard part could be formed accordingly at the rear side of the sealing device 8 in order to be placed over or inserted in a particularly tubular, slightly elastic pipe, so that in the backward direction the use of a soft part may optionally even be completely eliminated.

Figure 5:
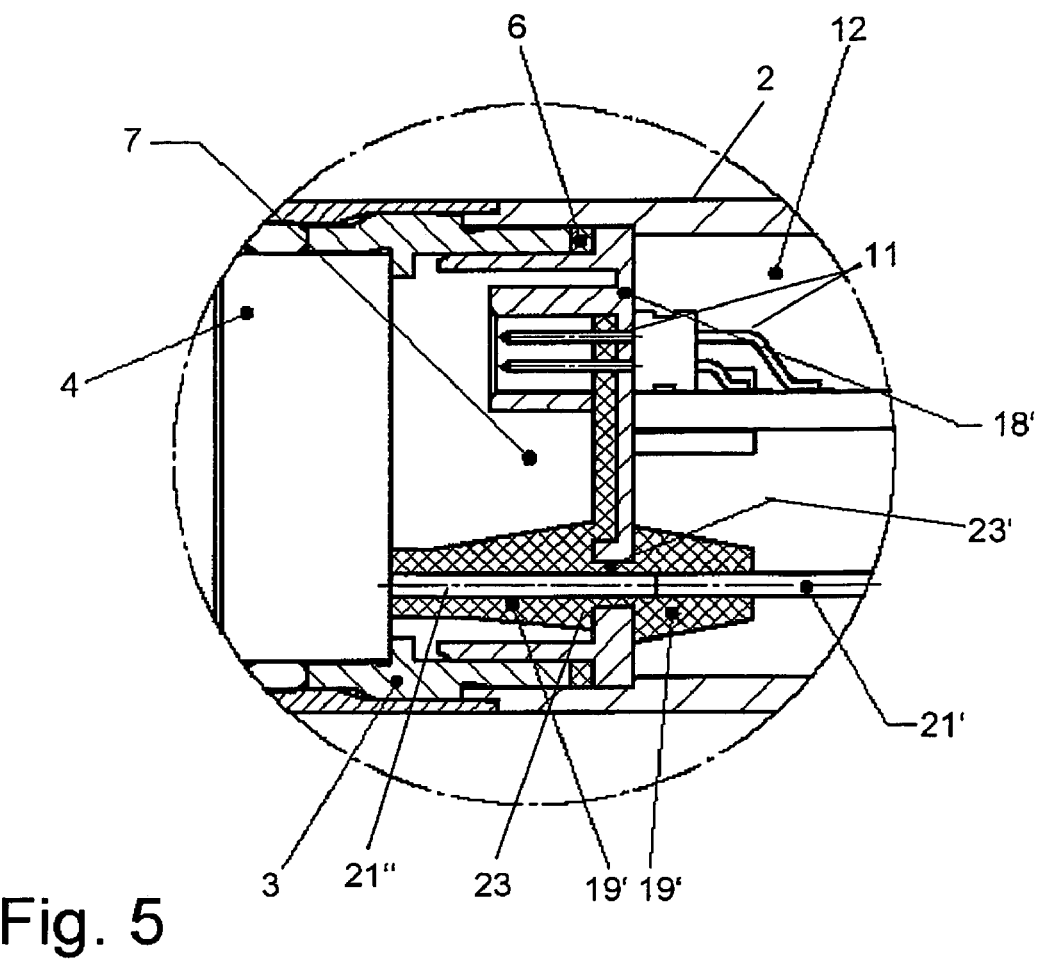
FIG. 5 is a yet another alternative embodiment having a modified sealing device.

FIG. 5 shows yet another embodiment, wherein the hard part 18' is configured as a substantially flat element. The pressure compensation opening 23' in this embodiment has larger dimensions than a pressure compensation pipe which extends through the opening or a pressure compensation opening extending through the soft part 19'. In order to enable tight sealing, the soft part 19', encompassing the corresponding pressure compensation lines 21', 21", extends through the pressure compensation opening 23' together with said lines. To this end, toward the pressure measuring cell 4 the pressure compensation line 21" is formed by an opening in the soft part 19', the opening, again by way of example, being dimensioned accordingly wide. Advantageously, the soft part 19' in both neighboring regions of the pressure compensation opening 23' encompasses the front and rear walls of the hard part 18' at least partially such that the hard part 18' and soft part 19' are tightly connected.

A further advantage of configurations of this type is that the evaluation electronics 14 in the rear space can optionally likewise be fastened to the sealing device 8 by means of snap hooks or connectors.

A further advantage is that the electrical connection, by means of the electric conductors 11, between the evaluation electronics 14 and the sensor electronics or the at least one electronic component 9 is routed through a sealing element in the form of the soft part 19 on the sealing device 8 and in this way during potting of the casting material 15 no casting material can flow into the free space having the electronic component 9 and/or the plug connection is configured to be air-tight.

The invention claimed is:

1. A sealing device (8) for sealing a pressure measuring cell housing (3), the sealing device (8) comprising a pressure compensation opening (23; 23') for a pressure compensation line (21; 21'; 21", 20) of a pressure measuring cell (4) received in the pressure measuring cell housing (3), characterized in that the sealing device (8) is made of a dimensionally stable hard part (18; 18*; 18') having at least one elastic soft part (19; 19°; 19*; 19'), which is disposed, particularly fastened, in the region of the pressure compensation opening (23; 23') on the hard part (18; 18*; 18').

2. The sealing device according to claim 1, wherein the hard part (18; 18*; 18') is made of a thermoplastic resin.

3. The sealing device according to claim 1, wherein the soft part (19; 19°; 19*; 19') is made of a thermoplastic elastomer.

4. A sealing device according to claim 1, wherein the hard part (18; 18*; 18') and the at least one soft part (19; 19°; 19*; 19') are produced by means of a two-component injection molding method.

5. A sealing device according to claim 1, wherein a recess is provided in the hard part (18; 18*) in the region of the pressure compensation opening (23) on at least one side in order to insert or introduce a pressure compensation line (21) and/or a soft part (19).

6. A sealing device according to claim 1, wherein in the region of the pressure compensation opening (23) an elevation, particularly a projecting tubular section of the hard part (18; 18*) is formed.

7. A sealing device according to claim 1, wherein the soft part (19') is configured to extend through the pressure compensation opening (23') penetrating the hard part (18').

8. A sealing device according to claim 1, wherein the soft part (19°) is disposed between the hard part (18) and an opening in the pressure measuring cell (4) or a pressure compensation line (20) such that it encompasses the pressure compensation opening (23).

9. The sealing device according to claim 8, wherein the soft part (19°) is configured to extend from the hard part (18) in the direction of the pressure measuring cell (4) up to the pressure measuring cell (4).

10. A pressure measuring cell device comprising a sealing device (8) according to claim 1 and comprising a pressure measuring cell (4), wherein between the sealing device (8) and the pressure measuring cell (4) a free space (7) having at least one electronic component (9) is formed.

11. The pressure measuring cell device according to claim 10, wherein the soft part (19°) of the sealing device (8) rests directly against the pressure measuring cell (4) such that it tightly seals an opening of the pressure measuring cell (4).

12. The pressure measuring cell according to claim 10, wherein the soft part (19) is configured such that it seals a pressure compensation line (20) of the pressure measuring cell (4), particularly in a tightly sealed manner.

13. A pressure measuring cell device according to claim 10, wherein the soft part (19; 19') encompasses a pressure compensation line (21; 21') in a tightly sealing manner, wherein the pressure compensation line (21; 21') on a side of the sealing device (8) facing away from the pressure measuring cell (4) leads through a housing (2) of a pressure measuring device.

14. A pressure measuring device (1) comprising a pressure measuring cell device according to claim 10 at the front of a housing (2), wherein a pressure compensation line (21; 21') extends through the housing (2) aligned with the pressure compensation opening (23; 23'), wherein the pressure compensation line (21; 21') is sealed by the soft part (19; 19') in relation to the housing interior of the housing (2), and wherein the housing interior is potted with a casting material (15).

15. A method for producing a sealing device according to claim 1, wherein the hard part (18; 18*; 18') and the at least one soft part (19; 19°; 19*; 19') are produced by means of a two-component injection molding method.

* * * * *